United States Patent
Han et al.

(10) Patent No.: US 10,819,898 B1
(45) Date of Patent: Oct. 27, 2020

(54) IMAGING DEVICE WITH FIELD-OF-VIEW SHIFT CONTROL

(71) Applicant: Facebook Technologies, LLC, Menlo Park, CA (US)

(72) Inventors: Chao Han, Pleasanton, CA (US); Fei Liu, San Jose, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/448,858

(22) Filed: Jun. 21, 2019

(51) Int. Cl.
| | |
|---|---|
| *H04N 5/349* | (2011.01) |
| *H04N 5/232* | (2006.01) |
| *H04N 5/225* | (2006.01) |
| *G06F 3/01* | (2006.01) |

(52) U.S. Cl.
CPC ......... *H04N 5/23212* (2013.01); *G06F 3/013* (2013.01); *H04N 5/2253* (2013.01); *H04N 5/2254* (2013.01)

(58) Field of Classification Search
None
See application file for complete search history.

(56) References Cited

U.S. PATENT DOCUMENTS

| | | | |
|---|---|---|---|
| 7,382,400 B2 | 6/2008 | Sablak | |
| 7,727,938 B2 | 6/2010 | Ballard | |
| 7,742,077 B2 | 6/2010 | Sablak et al. | |
| 9,210,312 B2 | 12/2015 | Sablak et al. | |
| 2014/0274391 A1* | 9/2014 | Stafford | H04N 13/327 463/32 |
| 2014/0375790 A1* | 12/2014 | Robbins | G02B 27/017 348/78 |
| 2016/0327793 A1* | 11/2016 | Chen | G02B 27/0093 |
| 2018/0348593 A1* | 12/2018 | Brown | G02B 27/646 |
| 2019/0235621 A1* | 8/2019 | Hu | G06T 7/248 |
| 2019/0317320 A1* | 10/2019 | Park | G02B 27/0101 |
| 2019/0365594 A1* | 12/2019 | Geisinger | G02B 27/0176 |
| 2020/0073123 A1* | 3/2020 | Martinez | G02B 27/0179 |
| 2020/0132888 A1* | 4/2020 | Perreault | G02B 27/0075 |

* cited by examiner

*Primary Examiner* — Christopher G Findley
(74) *Attorney, Agent, or Firm* — Pequignot + Myers; Matthew A. Pequignot (57) ABSTRACT

An imaging device includes a focusing element, an image sensor, and an actuator configured to translate at least one of the image sensor and the focusing element relative to each other. A controller of the imaging device is configured to use the image sensor to capture an image frame including at least a portion of the image of the object, determine a current position of the image of the object in the image frame, determine a deviation of the current position from a target position of the image of the object in the image frame, and operate the actuator to reduce the deviation. In this manner, the image of the object may be brought to a center of a captured image frame. Such an imaging device may be used as a self-aligning eye-tracking camera in a near-eye display.

20 Claims, 9 Drawing Sheets

IMAGING DEVICE WITH FIELD-OF-VIEW SHIFT CONTROL

TECHNICAL FIELD

The present disclosure relates to imaging devices, systems, and methods, and in particular to adaptable imaging devices, systems, and methods.

BACKGROUND

Head mounted displays (HMD), helmet mounted displays, near-eye displays (NED), and the like are being increasingly used for displaying virtual reality (VR) content, augmented reality (AR) content, mixed reality (MR) content, and they are finding applications in diverse fields including entertainment, education, training and biomedical science, to name just a few examples. The VR/AR/MR content can be made three-dimensional (3D) to enhance the experience and, in some cases, to match virtual objects to real objects observed by the user.

Eye position and gaze direction of a user of a VR/AR/MR system may be tracked in real time for the purpose of dynamically adjusting displayed imagery depending on the user's gaze direction, to provide a better experience of immersion into a simulated or augmented environment, and to perform some gaze-dependent, application-specific functions. A dedicated camera, termed an eye-tracking camera, may be used for determining the gaze direction and gaze convergence angle of the user. The eye-tracking camera takes multiple images of user's eyes, which may be illuminated with infrared illuminators. A controller may then analyze the eye images in real time and determine the eye positions and orientations from the images.

Regular eyewear, such as eyeglasses, comes in a variety of sizes and shapes to accommodate users having different facial features and interpupillary distances (IPD), i.e. distances between centers of pupils of the user's eyes. Near-eye displays, however, typically come in one size (for economical reasons), and the displays are made adjustable to accommodate different users.

A user might adjust their near-eye display based on how the images provided by the near-eye display appear to the user. Such an adjustment may not be easily done for eye-tracking cameras however, as the user typically has no direct feedback with regards to position of the eye-tracking cameras relative to the user's eyes. A user may not even suspect that such cameras are present in the near-eye display they are wearing.

SUMMARY

In accordance with the present disclosure, there is provided an imaging device comprising a focusing element for forming an image of an object at a focal plane, the focusing element having an image circle at the focal plane; an image sensor having a diagonal smaller than the image circle for capturing the image of the object; an actuator configured to translate at least one of the image sensor or the focusing element laterally relative to each other to shift a position of the image sensor within the image circle of the focusing element; and a controller operably coupled to the image sensor and the actuator. The controller is configured to use the image sensor to capture an image frame including at least a portion of the image of the object, determine a current position of the image of the object in the image frame, determine a deviation of the current position from a target position of the image of the object in the image frame, and operate the actuator to lessen the deviation. The imaging device may be an eye-tracking camera for tracking movements of a user's eye in a near-eye display.

In some embodiments, the actuator is configured to translate the image sensor relative to the focusing element. In some embodiments, the image sensor is disposed off-axis w.r.t. the focusing element when the actuator is not energized. The actuator may be configured to shift the position of the image sensor by at least 10% of a size of the image circle, or by at least 25% of the size of the image circle. The actuator may be configured to translate at least one of the image sensor or the focusing element laterally in two dimensions. The focusing element may include a lens element or a stack of lens elements. The actuator may include at least one of a voice coil motor, a piezo actuator, or a shape memory alloy coupled to a heater.

In accordance with the present disclosure, there is provided an eye-tracking camera comprising a focusing element for forming an image of a user's eye at a focal plane, the focusing element having an optical axis and an image circle at the focal plane, and an image sensor having a diagonal smaller than the image circle for capturing the image of the user's eye, where the image sensor is disposed at the focal plane off-axis and at an edge of the image circle. The image circle may have a diameter equal to or larger than 1.5 times the diagonal of the image sensor, or even larger than 2 times the diagonal of the image sensor.

In accordance with the present disclosure, there is further provided a method in a near-eye display. The method includes capturing an image frame including an eye image by an imaging device comprising a focusing element, an image sensor at a focal plane of the focusing element and within an image circle of the focusing element, the image sensor having a diagonal smaller than the image circle, and an actuator configured to laterally translate at least one of the image sensor or the focusing element relative to each other to shift a position of the image sensor within the image circle. The current position of the eye image in the image frame is determined. A deviation of the current position from a target position of the eye image in the image frame is determined. The actuator is operated to lessen the deviation.

In some embodiments, the actuator is operated to translate the image sensor relative to the focusing element. The actuator may the position of the image sensor by at least 10%, or by at least 25% of a size of the image circle. Capturing the image frame, determining the current position of the user's eye, determining the deviation of the current position form the target position, and operating the actuator to lessen the deviation may be performed upon affixing the near-eye display on a user's head. Capturing the image frame, determining the current position of the user's eye, determining the deviation of the current position form the target position, and operating the actuator may be repeated at regular time intervals to lessen the deviation.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

An eye-tracking camera may be placed at a side of a near-eye display device. The camera may be pointed at a location where a user's eye would be when the near-eye display device is worn by the user. However, due to difference of size and location of user's facial features, such as cheekbones and nose, supporting the near-eye display on the user's head, and different interpupillary distances (IPDs) of different users, the eye-tracking camera or cameras may be placed not optimally for some users, such that only a portion of the user's eye is visible to the camera. A non-optimal placement may impede or even completely disable the eye-tracking function of the camera.

In accordance with the present disclosure, an eye-tracking camera, or more generally an imaging device for imaging an object, may include an actuator configured to translate at least one of the camera's image sensor or the focusing element laterally relative to each other to shift a position of the image sensor within the image circle of the focusing element. A controller may be configured to capture an image frame including at least a portion of the image of the object, and to operate the actuator to bring the image of the object to the center of the frame, or at least to lessen a deviation of the current position of the image of the object from an optimal position.

Figure 1A:
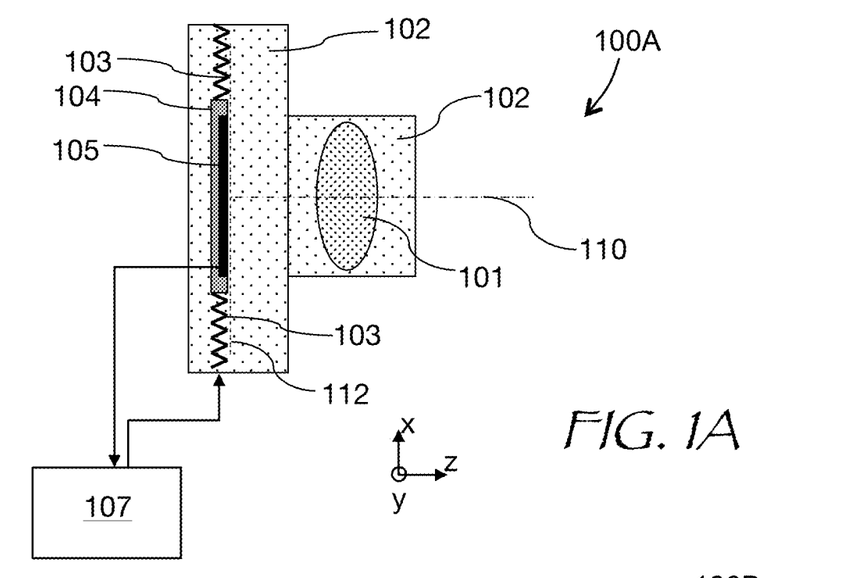
FIG. 1A is a schematic cross-sectional view of an imaging device of this disclosure, the device having an actuator for translating an image sensor relative to a focusing element.

Referring to FIG. 1A, an imaging device 100A includes a focusing element 101 having an optical axis 110 and a focal plane 112 where the image is formed. The focusing element 101 may be supported by a camera body 102. An image sensor 105 may be supported by a substrate 104. The image sensor 105 may include, for example, a silicon charged-coupled device (CCD) or complementary metal-oxide-semiconductor (CMOS) sensor, which may be sensitive to light in the visible, infrared (IR), and/or ultraviolet (UV) ranges. An actuator 103 may be mounted within the camera body 102. The actuator 103 may support the substrate 104 of the image sensor 105 and may be configured to translate the image sensor 105 inside the camera body 102 laterally, e.g. along x- or y-axis and perpendicular to z-axis, relative to the focusing element 101. The translation shifts the position of the image sensor 105 within the image circle of the focusing element 101. A controller 107 is operably coupled to the image sensor 105 and the actuator 103. The function of the controller 107 will be described further below.

The focusing element 101, such as a lens, for example, forms an image of an object, such as a human eye, at the focal plane 112. The lens may include a single lens element, e.g. a spherical or an aspherical lens, or a stack of such elements. The stack may be epoxied, oil-spaced, air-spaced, etc. A focusing actuator, not shown, may adjust a distance along the optical axis 110, which is parallel to z-axis, between the focusing element 101 and the image sensor 105, so as to bring the image sensor 105 to the focal plane 112 of the focusing element 101.

Figure 1B:
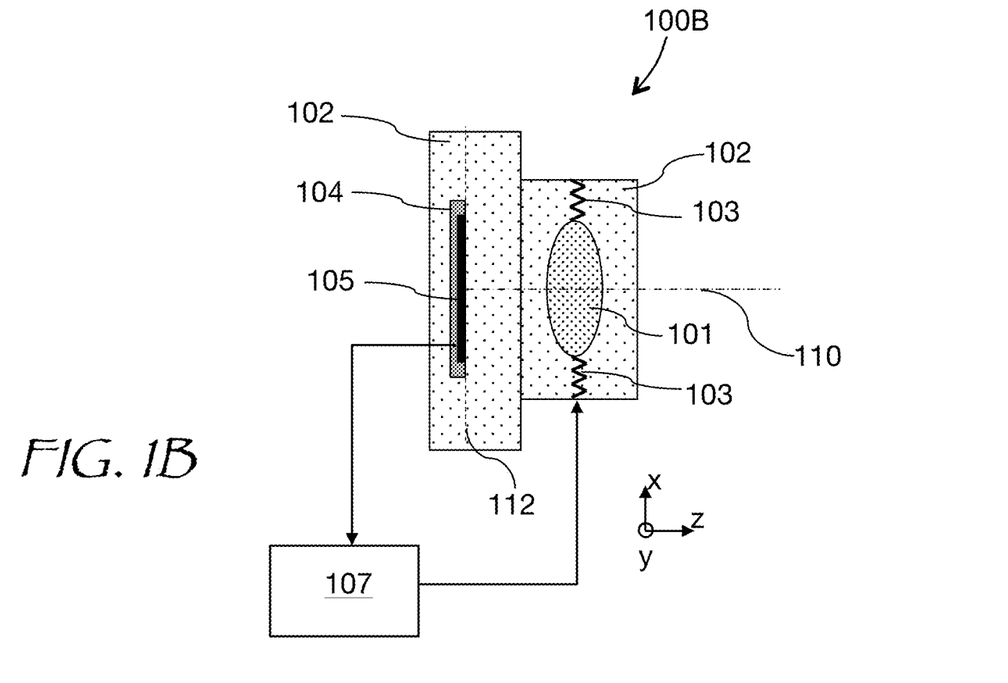
FIG. 1B is a schematic cross-sectional view of an imaging device of this disclosure, the device having an actuator for translating the focusing element relative to the image sensor.

Referring to FIG. 1B, an imaging device 100B is similar to the imaging device 100A of FIG. 1A. In the imaging device 100B of FIG. 1B, the actuator 103 supports the focusing element 101 and not the image sensor 105. The actuator 103 may be configured to translate the focusing element 101 inside the camera body 102 laterally, e.g. along x- and/or y-axis and perpendicular to z-axis, relative to the image sensor 105, to shift a position of the image sensor 105 within the image circle of the focusing element 101. More generally, the actuator 103 may be configured to translate at least one of the image sensor 105 or the focusing element 101 laterally relative to each other, in one or two dimensions, to shift a position of the image sensor 105 within the image circle of the focusing element 101.

Herein, the term "image circle" refers to an area on the focal plane 112 where an image of acceptable quality may be formed. For most focusing elements 101 such as lenses, the image circle has a circular shape. For some focusing elements, such as freeform prismatic focusing elements for example, the acceptable image area shape may be non-circular. It is noted that the term "image circle" as used herein is to be understood broadly as including non-circular image forming areas, as well.

Figure 2A:
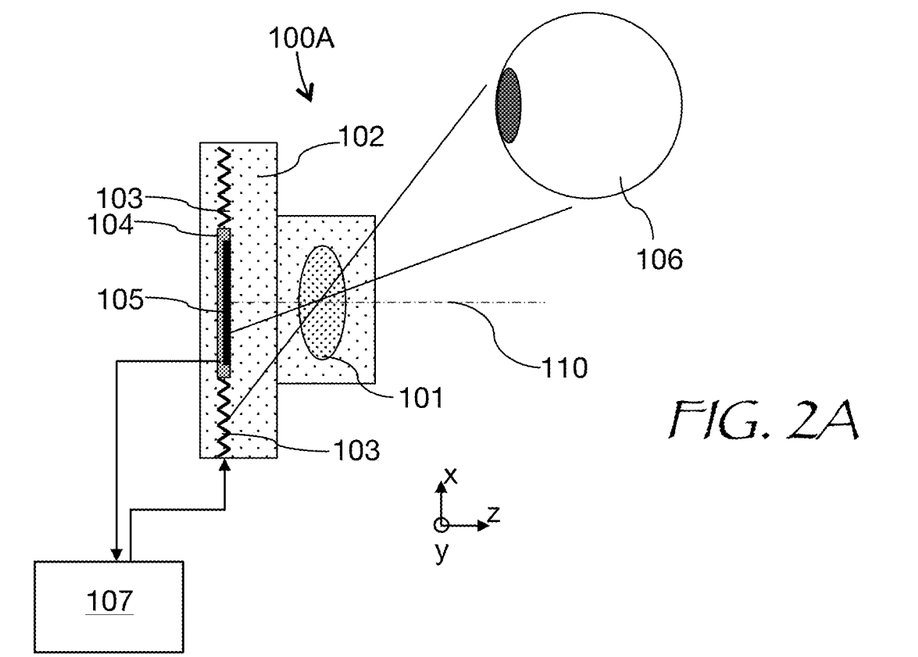
FIG. 2A is a schematic cross-sectional view of the imaging device of FIG. 1A at an initial position of the image sensor.

Referring to FIG. 2A, the image sensor 105 of the imaging device 100A is in an initial position, which is a centered position ("on-axis" position) in this example. Off-center or off-axis initial positions of the image sensor 105, where the image sensor 105 is offset from a center of the imaging circle of the focusing element 101, may also be used. The controller 107 may use the image sensor 105 to capture an image frame including at least a portion of a user's eye 106, or another object of a facial feature to be imaged e.g. caruncle, upper/lower eyelids, eyebrow, *glabella*/nose areas, lower temporal areas, etc.

The controller 107 may then determine a current position of the image of the eye 106 in the captured image frame. A deviation of the current position of the eye image from a target position of the eye image, e.g. the center position, in the image frame is determined. Once the deviation is known, it may be corrected by shifting or sliding the sensor 105 in a direction of lessening the deviation.

Figure 2B:
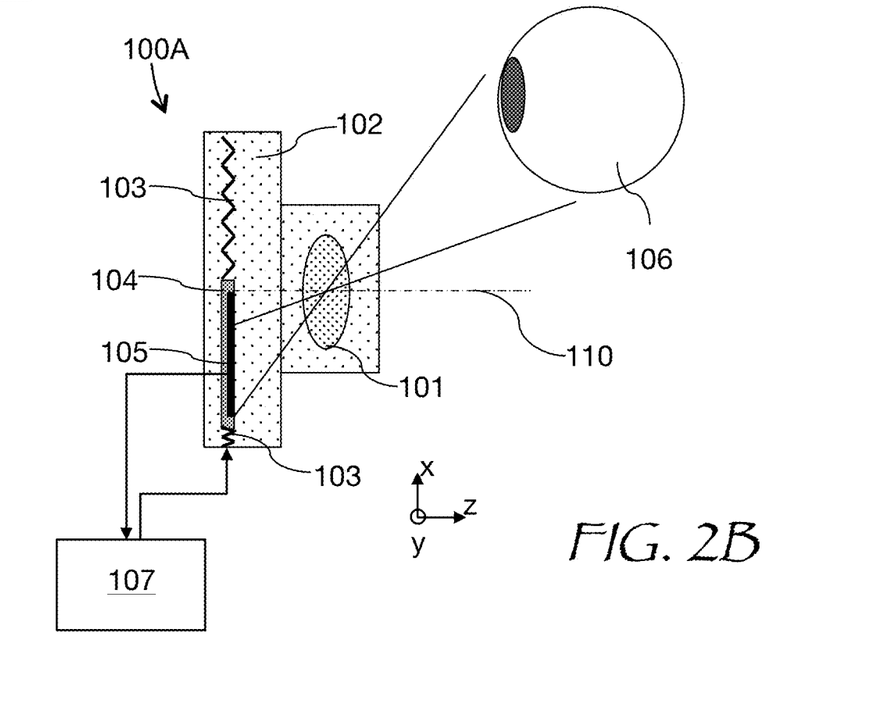
FIG. 2B is a schematic cross-sectional view of the imaging device of FIG. 1A at an adjusted position of the image sensor.

Turning to FIG. 2B, the actuator 103 is operated to lessen the deviation of the eye image from the desired position. In this example, the actuator 103 shifts the image sensor 105 down along x-axis, such that the eye image is closer to being centered on the image sensor 105. The amount of shift may be significant, depending on the display configuration. In some embodiments, the position of the image sensor 105 is shifted by at least 10% of a size of the image circle, or by at least 25% or even 50% of the size of the image circle. A second image frame may then be taken to confirm the progress.

Figure 3A:
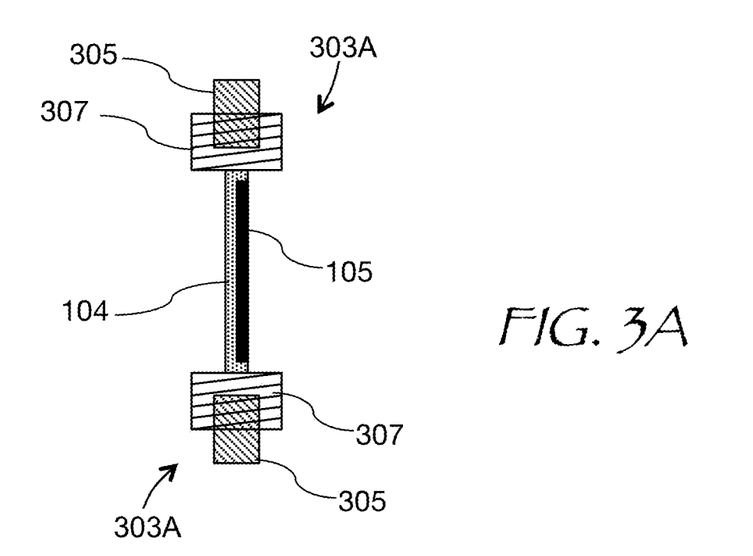
FIG. 3A is a schematic cross-sectional view of a voice coil motor embodiment of an actuator for adjusting the image sensor position or the focusing element position.

Various types of actuators 103 may be used. Referring to FIG. 3A, a voice coil actuator 303A is an embodiment of the actuator 103 of FIGS. 1A, 1B and FIGS. 2A, 2B. The voice coil actuator 303A includes a permanent magnet 305 being attracted or repulsed by a coil 307 depending on the direction of electrical current being applied to the coil 307. Two coils 307 may be attached to the substrate 104 of the image sensor 105 for a push-pull operation. In the voice coil actuator 303A, the coils 307 or the magnets 305 may be spring-loaded and attached to the image sensor 105, the focusing element 101, or both. Only one coil-magnet pair may be used. This is similar to a loudspeaker where a voice coil is mounted on a diaphragm of the speaker, and a permanent magnet is mounted to the speaker's base.

Figure 3B:
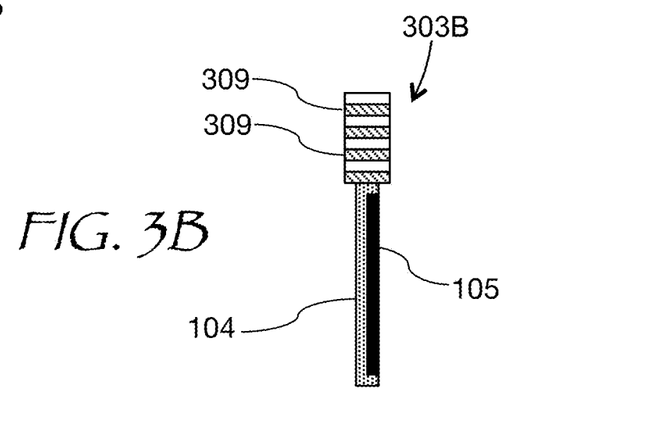
FIG. 3B is a schematic cross-sectional view of a piezo motor embodiment of an actuator for adjusting the image sensor position or the focusing element position.

In some embodiments, the actuator 103 may include a piezo motor. Referring to FIG. 3B, a piezo actuator 303B includes a column of piezo elements 309 mechanically coupled to the substrate 104 of the image sensor 105. The piezo elements 309 are stacked to increase the overall travel distance of the actuator. When a voltage is applied to the column of piezo elements 309, the column of piezo elements 309 shrinks or extends, thereby moving the image sensor 105 relative to the camera body/focusing element, not shown.

Figure 3C:
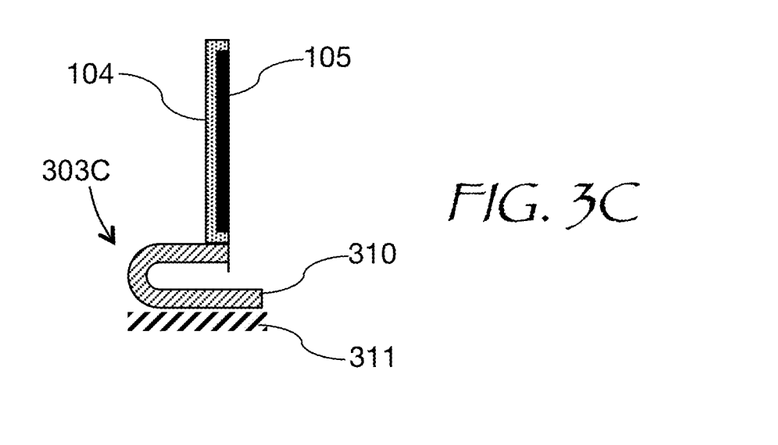
FIG. 3C is a schematic cross-sectional view of a shape memory alloy embodiment of an actuator for adjusting the image sensor position or the focusing element position.

Turning now to FIG. 3C, a memory alloy actuator 303C includes a shape memory alloy element 310 thermally coupled to a heater element 311, e.g. a resistive heater. Shape memory alloys may reversibly change their shape depending on temperature. When an electric current is applied to the heater element 311, the heater element 311 heats up, increasing the temperature of the shape memory alloy element 310. As temperature changes, the shape memory alloy element 310 expands or contracts, thereby moving the image sensor 105 relative to the camera body/focusing element, not shown. It is further noted that the actuators 303A to 303C shown in FIGS. 3A to 3C may be coupled to the focusing element 101 instead of, or in addition to, the image sensor 105.

Figure 4:
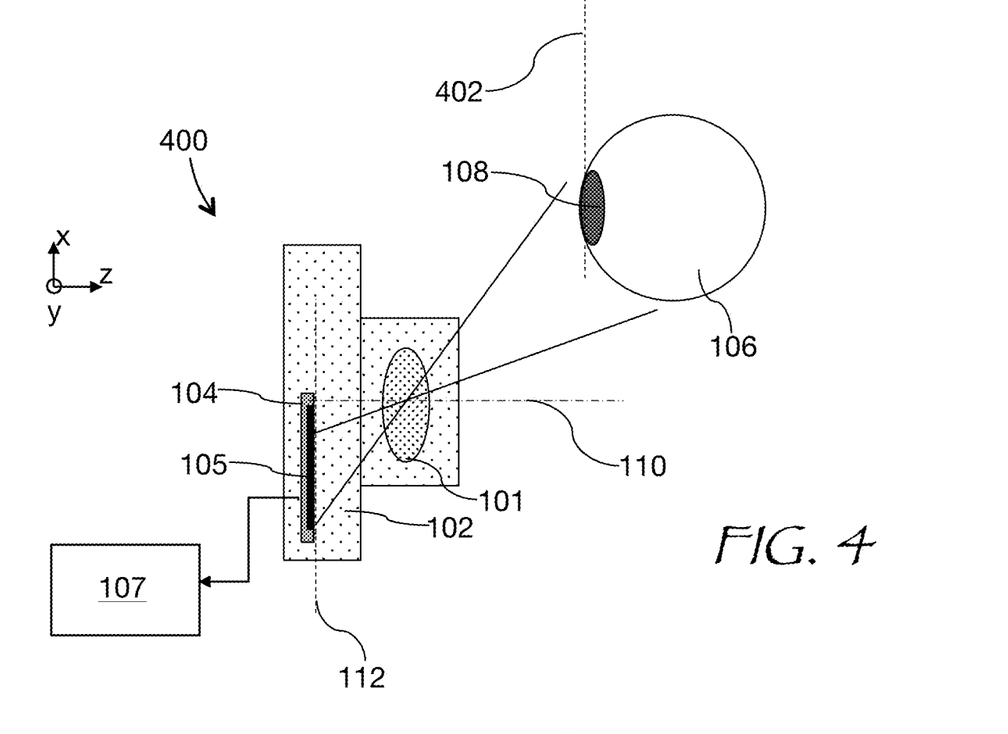
FIG. 4 is a schematic cross-sectional view of the imaging device embodiment without an actuator.

In some embodiments of the imaging device, the actuator 103 may be omitted altogether. Referring to FIG. 4, an eye-tracking camera 400 includes the focusing element 101, such as a lens, configured for forming an image of a user's eye 106 at the focal plane 112. The image sensor 105 is placed at the focal plane 112 off-axis, i.e. displaced from the optical axis 110, and may be disposed at an edge of an image circle of the focusing element 101. One advantage of this configuration is that the focal plane 112 may remain parallel to an inter-eye plane 402, i.e. a plane in which pupils 108 of both eyes 106 of the user are disposed. This helps to capture eye image without perspective projection distortion, and may simplify camera distortion calibration process for the purpose of eye tracking since no perspective projection distortion will be introduced in the image captured.

Figure 5:
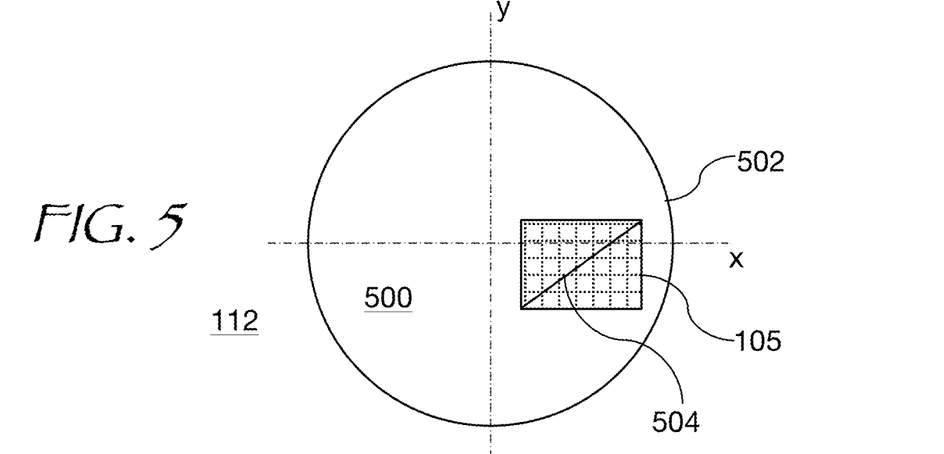
FIG. 5 is a plan view of the image sensor and the image circle of the focusing element.

FIG. 5 illustrates the position of the image sensor 105 relative to an image circle 500. In FIG. 5, the image sensor 105 is disposed at an edge 502 of the image circle 500. The image sensor 105 has a sensor diagonal 504, i.e. the largest linear dimension of the sensor in the focal plane 112, smaller than a size of the image circle 500. In some embodiments, the image circle 500 has a diameter equal to or larger than 1.5 times the length of the sensor diagonal 504, or even equal to or larger than 2× the length of the sensor diagonal 504. This configuration is applicable to both the eye-tracking camera 400 of FIG. 4 and the imaging devices 100A, 100B of FIGS. 1A and 1B, respectively. In case of the imaging devices 100A, 100B, the actuators 103 may be configured to translate the image sensor 105 across most of, or the entire area of the image circle 500, i.e. translate the image sensor 105 along either of, or both X and Y axes.

One advantage of adjusting field of view (FOV) of the imaging devices 100A, 100B by translating one of the image sensor 105 and/or the focusing element 101 relative to one another, as opposed to rotating the entire imaging device towards new eye position, is that the adjustment of the position of the image sensor 105 within the image circle 500 of the focusing element 101 does not produce perspective projection distortion, which simplifies calibration process of the imaging devices 100A, 100B. The adjustment may allow one to use imaging sensors of much smaller size, which may result in a significant cost reduction, as a price of an image sensor typically scales with its sensing area. Furthermore, for the field operation, small translators inside the camera body 102 may prove more reliable than comparatively large rotators of the entire imaging device.

Figure 6:
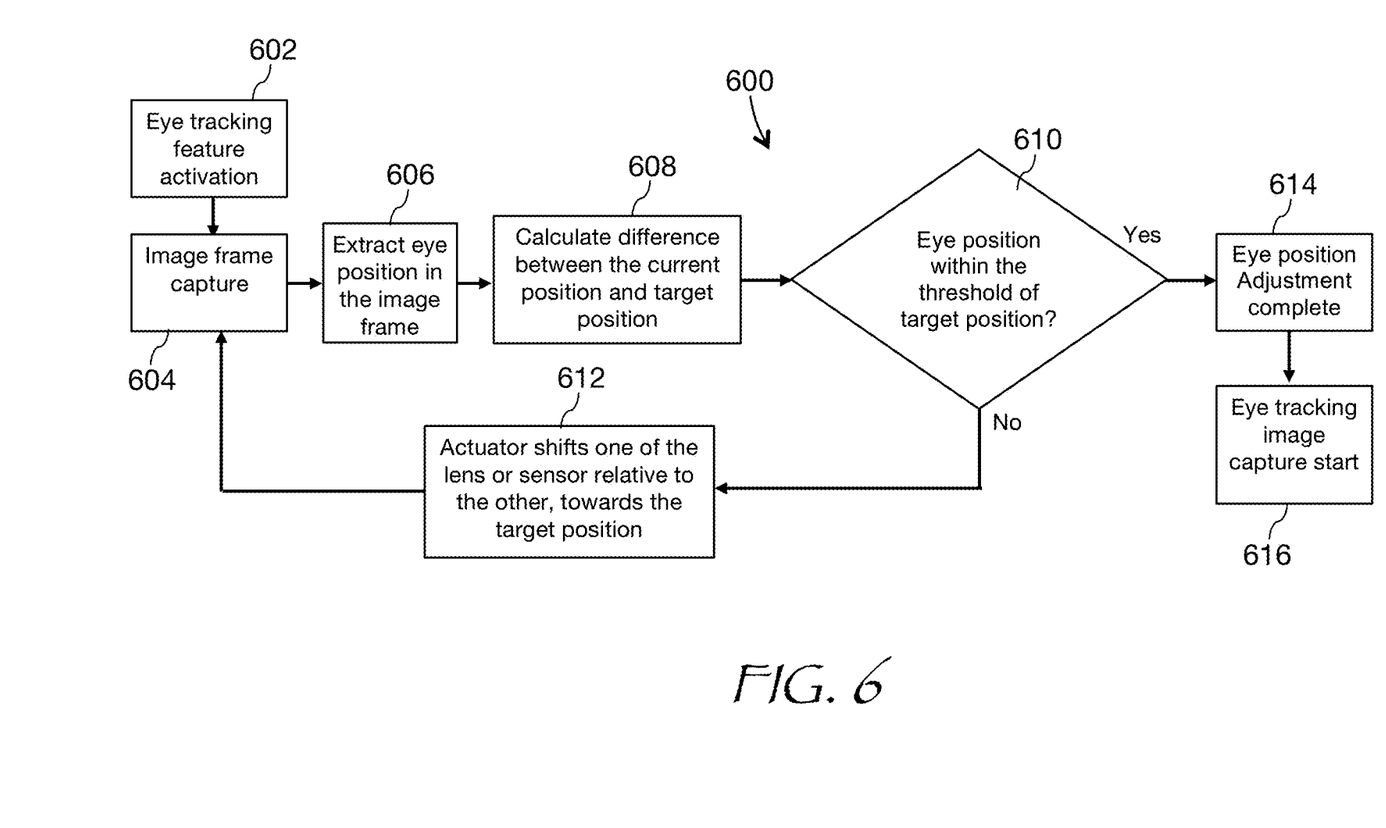
FIG. 6 is a flow chart of a method for operating an eye-tracking camera including the imaging device of FIGS. 1A and 1B.

Referring now to FIG. 6, a method 600 for operating an eye-tracking camera of a near-eye display includes activating (602) the eye tracking feature of the near-eye display. The activation may occur, for example, upon putting the near-eye display onto the user's head while the device is powered on. The image sensor 105 is used to capture an image frame including at least a portion of an eye image (604). A position of the eye image in the captured frame may then be determined (606) by analyzing the position of the pupil, cornea, sclera, eyelids, caruncle, eyebrow, etc. of the eye image in the image frame. If only a portion of the eye image is present in the frame, an extrapolation may be performed to determine an approximate position of the eye.

A difference may be computed (608) between the current position of the eye image and a desired position, e.g. a centered position in the captured frame, or another position enabling a controller of the near-eye display to reliably determine the eye true position and/or gaze direction. If the eye image position is not within a threshold distance of the desired position (i.e. a target position, "No" at box 610), then an actuator, e.g. the actuator 103 of FIGS. 1A, 1B, 2A, and 2B, and/or the actuator 303A of FIG. 3A, 303B of FIG. 3B, or 303C of FIG. 3C, is energized to introduce a controllable lateral shift between the focusing element 101 and the image sensor 105, to shift (612) a position of the image sensor 105 within the image circle 500 closer to the target position. Then, another eye image may be captured (604) and the eye position in the image frame may be determined (606). The difference between the current position of the eye image in the frame and the target position is determined again (608). If the eye image position is now within a threshold distance from the target position, then the FOV adjustment is considered complete (614), and the eye tracking process may start (616). The eye tracking may include taking a series of images of the user's eye, and determining the eye orientation, or gazing direction, in real time. A plurality of illuminators, e.g. infrared (IR) illuminators, may be used to illuminate the user's eye, forming small reflections (glints) in the user's eye. By comparing the eye pupil and/or cornea to the glint positions, the eye gazing direction may be determined.

Figure 7:
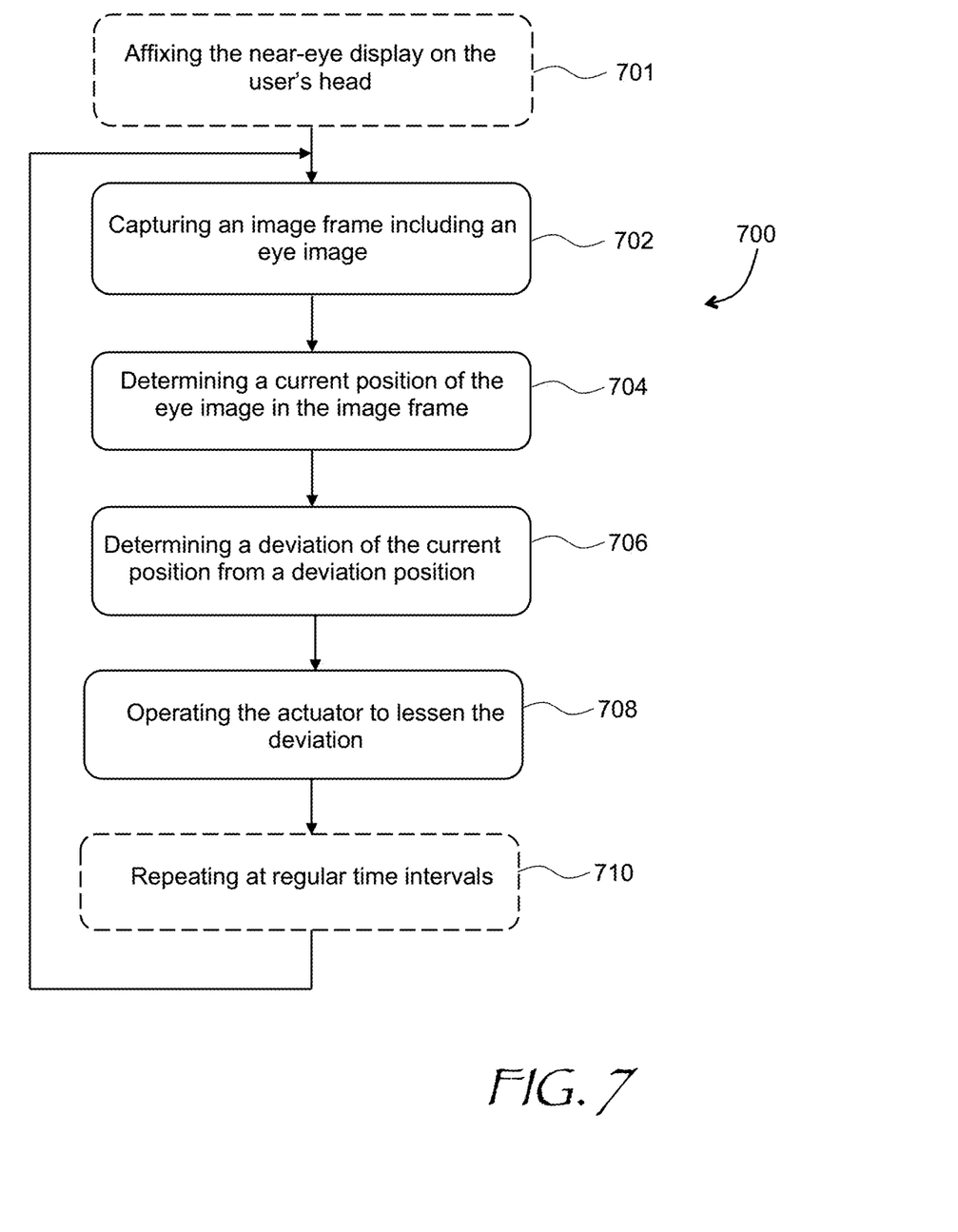
FIG. 7 is a flow chart of a method for operating the imaging devices of FIG. 1A or 1B.

Turning to FIG. 7, a method 700 for operating the imaging devices 100A or 100B of FIGS. 1A and 1B, respectively, is presented in application to eye tracking. The method 700 includes capturing (702) an image frame by the imaging device. The image frame includes an eye image, which may be offset from a target location in the image frame. A current position of the eye image in the image frame is determined (704). To determine the current position, the controller of the imaging device may use algorithms recognizing eye's pupil, cornea, sclera, eyelids, caruncle, eyebrow, etc.

A deviation of the current position from a target position of the eye image in the image frame is then determined (706). The deviation is directional, i.e. it may include both the magnitude and the direction of the deviation. Then, the actuator is operated (708) to lessen the deviation. In some embodiments, the actuator is coupled to the image sensor, and is operated to translate the image sensor relative to the focusing element. In other embodiments, the actuator is coupled to the focusing elements, and is configured to translate the focusing element. A pair of actuators may be used to translate both the image sensor and the focusing element.

The actuator may shift the position of the eye image in the image frame by a significant amount, e.g. by at least 10% of a size of the image circle, by at least 25% of the size of the image circle, or by at least 50% of the size of the image circle. This is different from image stabilization systems used in digital cameras where the amount of the required displacement is usually very small. The digital cameras image stabilization systems are not required to shift the image by that much. Furthermore, in the digital cameras stabilization systems, the feedback signal is obtained from a built-in acceleration sensor, not by taking an actual image, because the image sensor is busy exposing a frame during the image stabilization process.

In some embodiments, capturing the image frame (702), determining the current position of the eye (704), determining the deviation of the current position form the target position (706), and operating the actuator to lessen the deviation (708) is performed upon affixing the near-eye display on the user's head (701). This enables the near-eye display system to accommodate to different eye position and IPD of a different user of the display. In some embodiments, the steps of capturing the image frame (702), determining the current position of the eye (704), determining the deviation of the current position form the target position (706), and operating the actuator to lessen the deviation (708) are repeated (710) at regular time intervals to continue the eye-tracking system accommodation as the user is wearing the near-eye display, with the purpose of correcting for possible unintended shifts of the near-eye display relative to the face of the user as the user moves and turns in 3D space.

Figure 8:
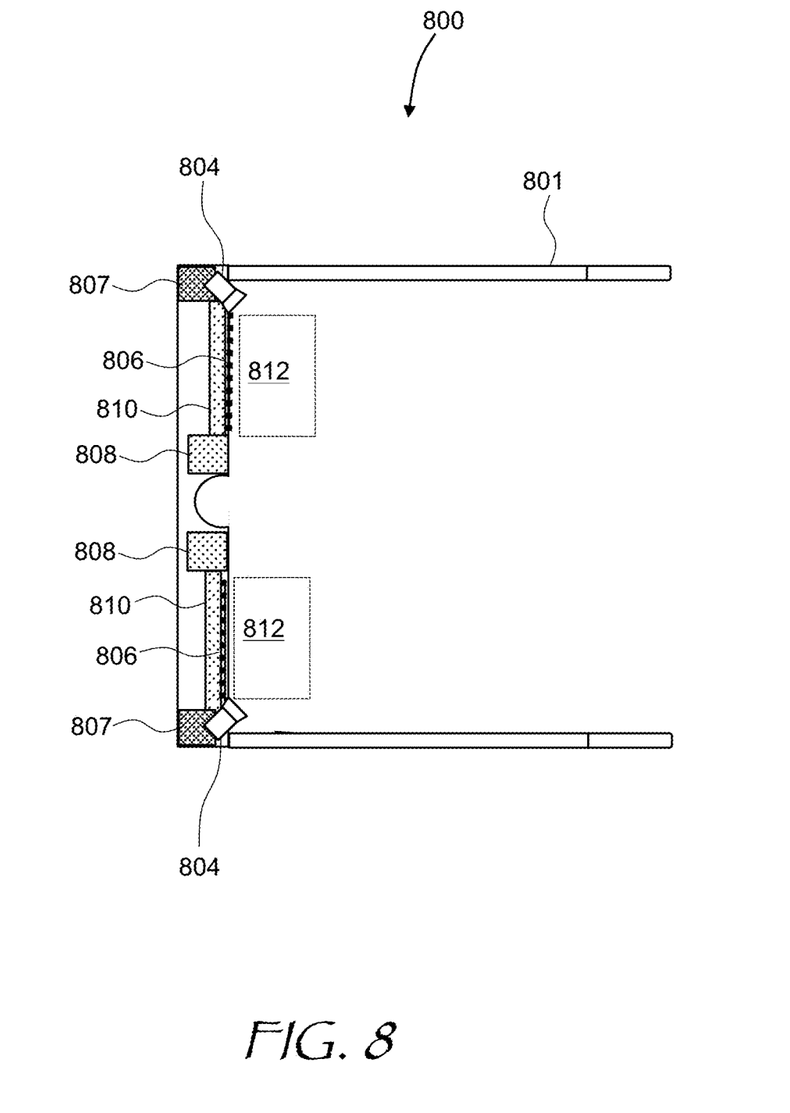
FIG. 8 is a top cross-sectional view of a near-eye display using an imaging device disclosed herein as an eye-tracking camera.

Referring to FIG. 8, a near-eye display 800 includes a frame 801 having a form factor of a pair of eyeglasses. The frame 801 supports, for each eye: a projector 808, a pupil replicator 810 optically coupled to the projector 808, an eye-tracking camera 804, a plurality of illuminators 806 for illuminating the eye, and an eye-tracking camera controller 807. The projector 808 provides a fan of light beams carrying an image in angular domain to be projected into the user's eye. The pupil replicator 810 receives the fan of light beams and provides multiple laterally offset copies of each beam of the fan of light beams, thereby extending the projected image over an eyebox 812. The eyebox 812 is a geometrical area where an image of acceptable quality is formed for observation by the eye of a user. In some embodiments, the pupil replicator 810 is made transparent or translucent to enable the user to view the outside world together with the images projected into each eye and superimposed with the outside world view. The images projected into each eye may include objects disposed with a simulated parallax, so as to appear immersed into the real world view.

The purpose of the eye-tracking cameras 804 is to determine position and orientation of both eyes of the user. Once the position and orientation of the user's eyes are known, a gaze convergence distance and direction may be determined. The imagery displayed by the projectors 808 may be adjusted dynamically to account for the user's gaze, for a better fidelity of immersion of the user into the displayed augmented reality scenery, and to provide specific functions of interaction with the augmented reality. The imaging devices 100A of FIG. 1A, 100B of FIG. 1B, and/or 400 of FIG. 4 may be used as the eye-tracking cameras 804.

The illuminators 806 may be disposed on the periphery of the pupil replicators 810 so as not to impede the outside world view. One purpose of the illuminators 806 may be to illuminate the eyes for to enable the eye-tracking cameras to obtain the images of the eyes; another purpose may be to provide reference reflections, or glints, that may function as reference points in the captured eye image, facilitating the eye gazing direction determination. The illuminating light may be invisible to the user; e.g. infrared or low-power ultraviolet light may be used. The illuminators 806 may be e.g. single-mode or multimode semiconductor light sources, including side-emitting laser diodes, vertical-cavity surface-emitting laser diodes, SLEDs, or light-emitting diodes, for example.

The function of the eye-tracking camera controllers 807 is to process images obtained by the eye-tracking cameras 804 to determine, in real time, the eye gazing directions of both eyes of the user. The eye-tracking camera controllers 807 may be configured to perform the method 600 of FIG. 6 for adjusting the field of view of the eye-tracking cameras 807 and/or the method 700 of FIG. 7 of operating the imaging devices of FIG. 1A or 1B. Only one eye-tracking camera controller 807 may be used. Furthermore, in some embodiments, the function of the eye-tracking camera controllers 807 may be absorbed by a central controller, not shown, of the near-eye display 800. The central controller provides control signals to the projectors 808 to generate the images to be displayed to the user.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 9A:
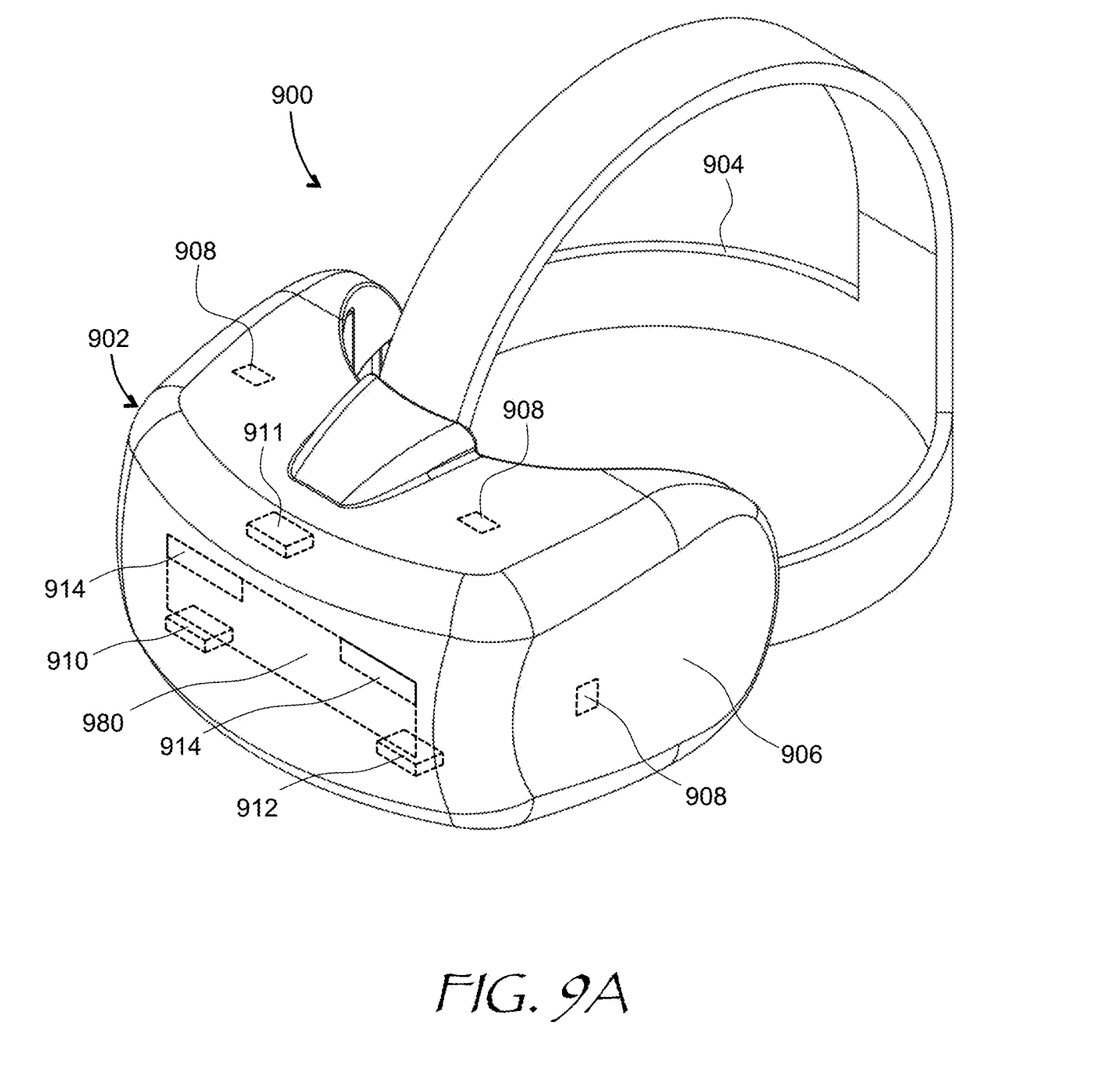
FIG. 9A is an isometric view of a head-mounted display of the present disclosure using imaging devices disclosed herein.

Referring to FIG. 9A, an HMD 900 is an example of an AR/VR wearable display system which encloses the user's face, for a greater degree of immersion into the AR/VR environment. The HMD 900 may include imaging devices and eye-tracking cameras disclosed herein. The function of the HMD 900 is to augment views of a physical, real-world environment with computer-generated imagery, and/or to generate the entirely virtual 3D imagery. The HMD 900 may include a front body 902 and a band 904. The front body 902 is configured for placement in front of eyes of a user in a reliable and comfortable manner, and the band 904 may be stretched to secure the front body 902 on the user's head. A display system 980 may be disposed in the front body 902 for presenting AR/VR imagery to the user. Sides 906 of the front body 902 may be opaque or transparent.

In some embodiments, the front body 902 includes locators 908 and an inertial measurement unit (IMU) 910 for tracking acceleration of the HMD 900, and position sensors 912 for tracking position of the HMD 900. The IMU 910 is an electronic device that generates data indicating a position of the HMD 900 based on measurement signals received from one or more position sensors 912, which generate one or more measurement signals in response to motion of the HMD 900. Examples of position sensors 912 include: one or more accelerometers, one or more gyroscopes, one or more magnetometers, another suitable type of sensor that detects motion, a type of sensor used for error correction of the IMU 910, or some combination thereof. The position sensors 912 may be located external to the IMU 910, internal to the IMU 910, or some combination thereof.

The locators 908 are traced by an external imaging device of a virtual reality system, such that the virtual reality system can track the location and orientation of the entire HMD 900. Information generated by the IMU 910 and the position sensors 912 may be compared with the position and orientation obtained by tracking the locators 908, for improved tracking accuracy of position and orientation of the HMD 900. Accurate position and orientation is important for presenting appropriate virtual scenery to the user as the latter moves and turns in 3D space.

The HMD 900 may further include a depth camera assembly (DCA) 911, which captures data describing depth information of a local area surrounding some or all of the HMD 900. To that end, the DCA 911 may include a laser radar (LIDAR), or a similar device. The depth information may be compared with the information from the IMU 910, for better accuracy of determination of position and orientation of the HMD 900 in 3D space.

The HMD 900 may further include an eye tracking system 914 for determining orientation and position of user's eyes in real time. The eye tracking system 914 may include any of the imaging devices and eye-tracking cameras disclosed herein, e.g. the imaging device 100A and 100B of FIGS. 1A and 1B, respectively, and/or the eye-tracking camera 400 of FIG. 4. The obtained position and orientation of the eyes also allows the HMD 900 to determine the gaze direction of the user and to adjust the image generated by the display system 980 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 902.

Figure 9B:
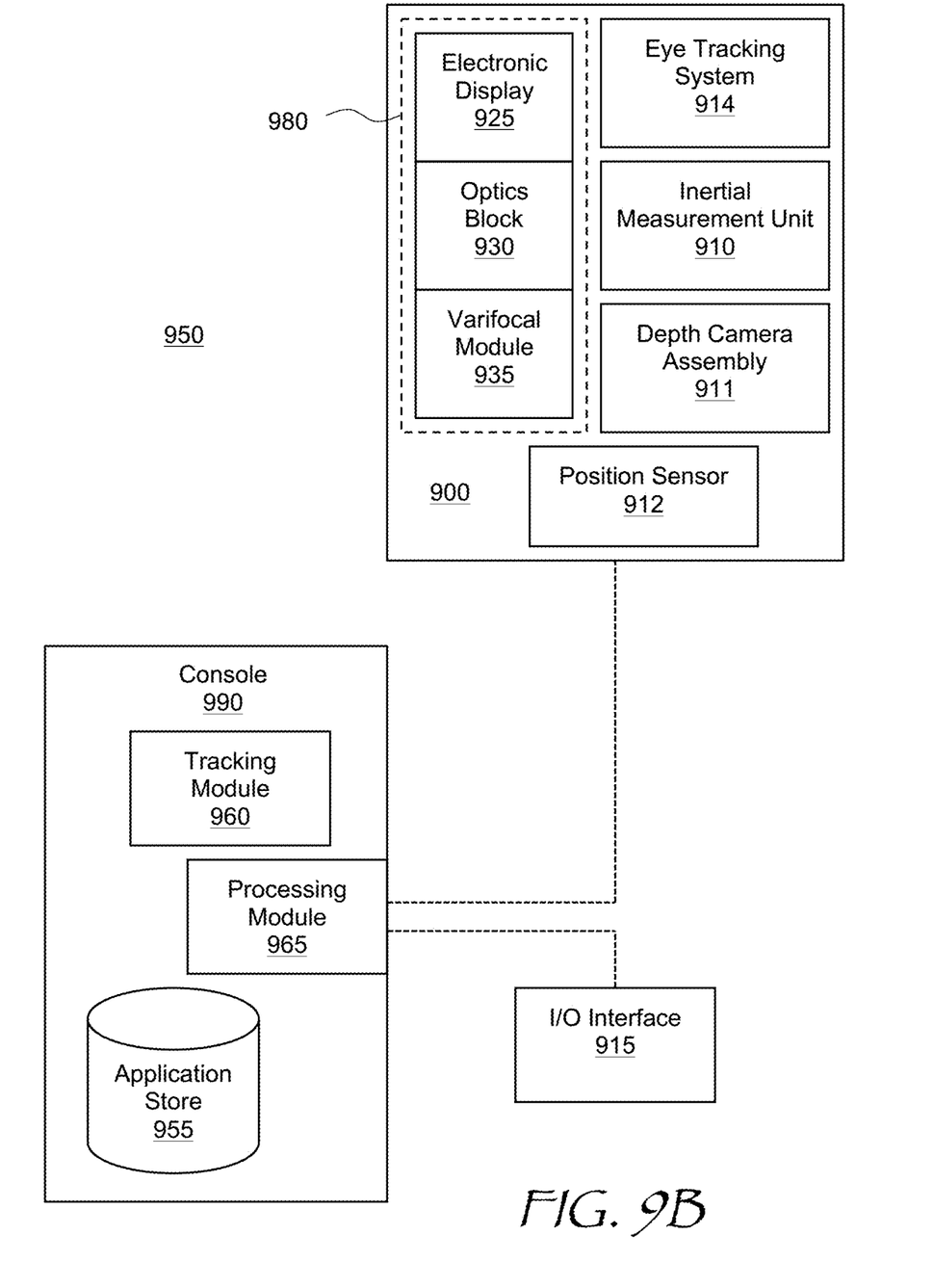
FIG. 9B is a block diagram of a virtual reality system including the headset of FIG. 9A.

Referring to FIG. 9B, an AR/VR system 950 may include electronic drivers, light sources, and projector displays disclosed herein. The AR/VR system 950 includes the HMD 900 of FIG. 9A, an external console 990 storing various AR/VR applications, setup and calibration procedures, 3D videos, etc., and an input/output (I/O) interface 915 for operating the console 990 and/or interacting with the AR/VR environment. The HMD 900 may be "tethered" to the console 990 with a physical cable, or connected to the console 990 via a wireless communication link such as Bluetooth®, Wi-Fi, etc. There may be multiple HMDs 900, each having an associated I/O interface 915, with each HMD 900 and I/O interface(s) 915 communicating with the console 990. In alternative configurations, different and/or additional components may be included in the AR/VR system 950. Additionally, functionality described in conjunction with one or more of the components shown in FIGS. 9A and 9B may be distributed among the components in a different manner than described in conjunction with FIGS. 9A and 9B in some embodiments. For example, some or all of the functionality of the console 915 may be provided by the HMD 900, and vice versa. The HMD 900 may be provided with a processing module capable of achieving such functionality.

As described above with reference to FIG. 9A, the HMD 900 may include the eye tracking system 914 (FIG. 9B) for tracking eye position and orientation, determining gaze angle and convergence angle, etc., the IMU 910 for determining position and orientation of the HMD 900 in 3D space, the DCA 911 for capturing the outside environment, the position sensor 912 for independently determining the position of the HMD 900, and the display system 980 for displaying AR/VR content to the user. The display system 980 may include an optics block 930, whose function is to convey the images generated by the electronic display 925 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 980 may further include a varifocal module 935, which may be a part of the optics block 930. The function of the varifocal module 935 is to adjust the focus of the optics block 930 e.g. to compensate for vergence-accommodation conflict, to correct for vision defects of a particular user, to offset aberrations of the optics block 930, etc.

The I/O interface 915 is a device that allows a user to send action requests and receive responses from the console 990. An action request is a request to perform a particular action. For example, an action request may be an instruction to start or end capture of image or video data or an instruction to perform a particular action within an application. The I/O interface 915 may include one or more input devices, such as a keyboard, a mouse, a game controller, or any other suitable device for receiving action requests and communicating the action requests to the console 990. An action request received by the I/O interface 915 is communicated to the console 990, which performs an action corresponding to the action request. In some embodiments, the I/O interface 915 includes an IMU that captures calibration data indicating an estimated position of the I/O interface 915 relative to an initial position of the I/O interface 915. In some embodiments, the I/O interface 915 may provide haptic feedback to the user in accordance with instructions received from the console 990. For example, haptic feedback can be provided when an action request is received, or the console 990 communicates instructions to the I/O interface 915 causing the I/O interface 915 to generate haptic feedback when the console 990 performs an action.

The console 990 may provide content to the HMD 900 for processing in accordance with information received from one or more of: the IMU 910, the DCA 911, the eye tracking system 914, and the I/O interface 915. In the example shown in FIG. 9B, the console 990 includes an application store 955, a tracking module 960, and a processing module 965. Some embodiments of the console 990 may have different modules or components than those described in conjunction with FIG. 9B. Similarly, the functions further described below may be distributed among components of the console 990 in a different manner than described in conjunction with FIGS. 9A and 9B.

The application store 955 may store one or more applications for execution by the console 990. An application is a group of instructions that, when executed by a processor, generates content for presentation to the user. Content generated by an application may be in response to inputs received from the user via movement of the HMD 900 or the I/O interface 915. Examples of applications include: gaming applications, presentation and conferencing applications, video playback applications, or other suitable applications.

The tracking module 960 may calibrate the AR/VR system 950 using one or more calibration parameters and may adjust one or more calibration parameters to reduce error in determination of the position of the HMD 900 or the I/O interface 915. Calibration performed by the tracking module 960 also accounts for information received from the IMU 910 in the HMD 900 and/or an IMU included in the I/O interface 915, if any. Additionally, if tracking of the HMD 900 is lost, the tracking module 960 may re-calibrate some or all of the AR/VR system 950.

The tracking module 960 may track movements of the HMD 900 or of the I/O interface 915, the IMU 910, or some combination thereof. For example, the tracking module 960 may determine a position of a reference point of the HMD 900 in a mapping of a local area based on information from the HMD 900. The tracking module 960 may also determine positions of the reference point of the HMD 900 or a reference point of the I/O interface 915 using data indicating a position of the HMD 900 from the IMU 910 or using data indicating a position of the I/O interface 915 from an IMU included in the I/O interface 915, respectively. Furthermore, in some embodiments, the tracking module 960 may use portions of data indicating a position or the HMD 900 from the IMU 910 as well as representations of the local area from the DCA 911 to predict a future location of the HMD 900. The tracking module 960 provides the estimated or predicted future position of the HMD 900 or the I/O interface 915 to the processing module 965.

The processing module 965 may generate a 3D mapping of the area surrounding some or all of the HMD 900 ("local area") based on information received from the HMD 900. In some embodiments, the processing module 965 determines depth information for the 3D mapping of the local area based on information received from the DCA 911 that is relevant for techniques used in computing depth. In various embodiments, the processing module 965 may use the depth information to update a model of the local area and generate content based in part on the updated model.

The processing module 965 executes applications within the AR/VR system 950 and receives position information, acceleration information, velocity information, predicted future positions, or some combination thereof, of the HMD 900 from the tracking module 960. Based on the received information, the processing module 965 determines content to provide to the HMD 900 for presentation to the user. For example, if the received information indicates that the user has looked to the left, the processing module 965 generates content for the HMD 900 that mirrors the user's movement in a virtual environment or in an environment augmenting the local area with additional content. Additionally, the processing module 965 performs an action within an application executing on the console 990 in response to an action request received from the I/O interface 915 and provides feedback to the user that the action was performed. The provided feedback may be visual or audible feedback via the HMD 900 or haptic feedback via the I/O interface 915.

In some embodiments, based on the eye tracking information (e.g., orientation of the user's eyes) received from the eye tracking system 914, the processing module 965 determines resolution of the content provided to the HMD 900 for presentation to the user on the electronic display 925. The processing module 965 may provide the content to the HMD 900 having a maximum pixel resolution on the electronic display 925 in a foveal region of the user's gaze. The processing module 965 may provide a lower pixel resolution in other regions of the electronic display 925, thus lessening power consumption of the AR/VR system 950 and saving computing resources of the console 990 without compromising a visual experience of the user. In some embodiments, the processing module 965 can further use the eye tracking information to adjust where objects are displayed on the electronic display 925 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An imaging device comprising:
    a focusing element for forming an image of an object at a focal plane, the focusing element having an image circle at the focal plane;
    an image sensor having a diagonal smaller than the image circle for capturing the image of the object;
    an actuator configured to translate at least one of the image sensor or the focusing element laterally relative to each other to shift a position of the image sensor within the image circle of the focusing element; and
    a controller operably coupled to the image sensor and the actuator and configured to:
        use the image sensor to capture an image frame including at least a portion of the image of the object;
        determine a current position of the image of the object in the image frame;
        determine a deviation of the current position from a target position of the image of the object in the image frame; and
        operate the actuator to lessen the deviation.

2. The imaging device of claim 1, wherein the imaging device is an eye-tracking camera for tracking movements of a user's eye in a near-eye display.

3. The imaging device of claim 1, wherein the actuator is configured to translate the image sensor relative to the focusing element.

4. The imaging device of claim 1, wherein the image sensor is disposed off-axis w.r.t. the focusing element when the actuator is not energized.

5. The imaging device of claim 1, wherein the actuator is configured to shift the position of the image sensor by at least 10% of a size of the image circle.

6. The imaging device of claim 5, wherein the actuator is configured to shift the position of the image sensor by at least 25% of the size of the image circle.

7. The imaging device of claim 1, wherein the actuator is configured to translate at least one of the image sensor or the focusing element laterally in two dimensions.

8. The imaging device of claim 1, wherein the focusing element comprises a lens element or a stack of lens elements.

9. The imaging device of claim 1, wherein the actuator comprises a voice coil motor.

10. The imaging device of claim 1, wherein the actuator comprises a piezo actuator.

11. The imaging device of claim 1, wherein the actuator comprises a shape memory alloy coupled to a heater.

12. An eye-tracking camera comprising:
    a focusing element for forming an image of a user's eye at a focal plane, the focusing element having an optical axis and an image circle at the focal plane; and
    an image sensor having a diagonal smaller than the image circle for capturing the image of the user's eye;
    wherein the image sensor is disposed at the focal plane off-axis and at an edge of the image circle.

13. The eye-tracking camera of claim 12, wherein the image circle has a diameter equal to or larger than 1.5 times diagonal of the image sensor.

14. The eye-tracking camera of claim 12, wherein the image circle has a diameter equal to or larger than two times the diagonal of the image sensor.

15. A method in a near-eye display, the method comprising:
    capturing an image frame including an eye image by an imaging device comprising a focusing element, an image sensor at a focal plane of the focusing element and within an image circle of the focusing element, the image sensor having a diagonal smaller than the image circle, and an actuator configured to laterally translate at least one of the image sensor or the focusing element relative to each other to shift a position of the image sensor within the image circle;
    determining a current position of the eye image in the image frame;
    determining a deviation of the current position from a target position of the eye image in the image frame; and
    operating the actuator to lessen the deviation.

16. The method of claim 15, wherein the actuator is operated to translate the image sensor relative to the focusing element.

17. The method of claim 15, wherein the actuator shifts the position of the image sensor by at least 10% of a size of the image circle.

18. The method of claim 17, wherein the actuator shifts the position of the image sensor by at least 25% of the size of the image circle.

19. The method of claim 15, wherein capturing the image frame, determining the current position of the user's eye, determining the deviation of the current position form the target position, and operating the actuator to lessen the deviation is performed upon affixing the near-eye display on a user's head.

20. The method of claim 15, further comprising repeating capturing the image frame, determining the current position of the user's eye, determining the deviation of the current position form the target position, and operating the actuator to lessen the deviation at regular time intervals.

* * * * *